US012796853B2

(12) United States Patent
Weber

(10) Patent No.: US 12,796,853 B2
(45) Date of Patent: Nov. 17, 2026

(54) COFFEE MAKER

(71) Applicant: Strategic Exits LLC, Incline Village, NV (US)

(72) Inventor: Douglas Weber, Incline Village, NV (US)

(73) Assignee: Strategic Exits LLC, Incline Village, NV (US)

( * ) Notice: Subject to any disclaimer, the term of this patent is extended or adjusted under 35 U.S.C. 154(b) by 883 days.

(21) Appl. No.: 18/136,044

(22) Filed: Apr. 18, 2023

(65) Prior Publication Data

US 2024/0349930 A1 Oct. 24, 2024

(51) Int. Cl.

*A47J 31/30* (2006.01)
*A47J 31/06* (2006.01)
(Continued)

(52) U.S. Cl.

CPC ......... *A47J 31/303* (2013.01); *A47J 31/0663* (2013.01); *A47J 31/0684* (2013.01);
(Continued)

(58) Field of Classification Search

CPC .. A47J 31/42; A47J 31/46; A47J 31/20; A47J 31/057; A47J 31/60; A47J 31/40;
(Continued)

(56) References Cited

U.S. PATENT DOCUMENTS 3,111,079 A * 11/1963 Lescure ................ A47J 31/303 99/293
5,492,054 A * 2/1996 Schneeberger ..... A47J 31/3609 99/287
(Continued)

FOREIGN PATENT DOCUMENTS

EP 1600086 11/2005
WO 0045686 8/2000
(Continued)

OTHER PUBLICATIONS en.wikipedia.org, Aug. 2, 2022, https://en.wikipedia.org/wiki/Moka_pot.
(Continued)

*Primary Examiner* — Steven W Crabb
*Assistant Examiner* — Ket D Dang
(74) *Attorney, Agent, or Firm* — Todd R. Miller

(57) ABSTRACT

A coffee maker comprises a one-piece body having a top and a bottom, and a brew pod removably disposed within the one-piece body. The brew pod includes a grounds basket, one or more straws disposed under the grounds basket, and a snorkel removably disposed above the grounds basket. The body has locking channels that mate with locking tabs on the brew pod. The snorkel includes a spout, an engagement member disposed under the spout, and a top hat disposed above the spout. A gasket with means for retaining a filtering means may be disposed between the engagement member and the grounds basket. The coffee maker may include means for lifting the one-piece body away from a heat source used during the brewing process. Such a lifting arrangement may also have a lid with an extension means to extend the lid away from the one-piece body during the brewing process.

14 Claims, 5 Drawing Sheets

(51) Int. Cl.
*A47J 31/08* (2006.01)
*A47J 31/44* (2006.01)
*A47J 31/46* (2006.01)

(52) U.S. Cl.
CPC ......... *A47J 31/085* (2013.01); *A47J 31/4407* (2013.01); *A47J 31/46* (2013.01)

(58) Field of Classification Search
CPC .... A47J 31/404; A47J 31/4475; A47J 31/465; A47J 31/3609; A47J 31/3619; A47J 42/38; A47J 31/0573; A47J 31/06; A47J 31/0631; A47J 31/41; A47J 31/3633; A47J 31/4407; A47J 31/002; A47J 31/0642; A47J 31/0668; A47J 31/0689; A47J 31/407; A47J 31/4403; A47J 31/52; A47J 31/22; A47J 31/525; A47J 31/02; A47J 31/0647; A47J 31/0663; A47J 31/0684; A47J 31/085; A47J 31/303; A47J 31/36; A47J 31/3676; A47J 31/401; A47J 31/4492; A47J 31/461; A47J 43/0465; A47J 2031/0694; A47J 31/446; A47J 31/4478; A47J 31/468; A47J 31/521; A47J 31/5253; A47J 31/5255; A47J 31/56; A47J 527/21016; A47J 27/21166; A47J 31/54; A47J 31/4485; A23F 5/26; A23F 5/24; B05B 1/02; B05B 12/16; B05B 9/002; B05B 9/0403; B05B 5/006; B08B 3/102; B08B 9/0813; F16D 2055/0091; F16D 55/226; F16D 65/095; F25D 23/126; B65D 85/8043; B65D 85/8061
USPC ............................................................ 99/290
See application file for complete search history.

(56) References Cited

U.S. PATENT DOCUMENTS

| | | | | | |
|---|---|---|---|---|---|
| 5,586,484 | A * | 12/1996 | Piazza | A47J 31/303 | 426/433 |
| 5,902,620 | A * | 5/1999 | Nolan | A47J 31/303 | 99/302 R |
| 6,103,116 | A * | 8/2000 | Koslow | A47J 31/0647 | 426/77 |
| 6,823,771 | B2 * | 11/2004 | Piazza | A47J 31/303 | 99/303 |
| 7,661,354 | B2 * | 2/2010 | Shao | A47J 31/303 | 99/280 |
| 8,528,468 | B2 | 9/2013 | Boussemart | | |
| 12,029,344 | B2 * | 7/2024 | Pendas | A47J 31/446 | |
| 2005/0279215 | A1 | 12/2005 | Cai | | |
| 2008/0206418 | A1 | 8/2008 | Ranzoni | | |
| 2014/0106036 | A1 * | 4/2014 | Cardoso | B65B 29/022 | 426/115 |
| 2015/0351580 | A1 * | 12/2015 | Ferraro | A47J 31/0647 | 426/431 |
| 2024/0349931 | A1 * | 10/2024 | Jung | A47J 31/303 | |

FOREIGN PATENT DOCUMENTS

| | | |
|---|---|---|
| WO | 2008087673 | 7/2008 |
| WO | 2022032955 | 2/2022 |

OTHER PUBLICATIONS thedarkestroast.com, Apr. 13, 2023, https://thedarkestroast.com/how-to-use-a-moka-pot/.

* cited by examiner

COFFEE MAKER

BACKGROUND

The present disclosure relates generally to coffee makers and particularly to those commonly referred to as moka pots.

OBJECT AND SUMMARY

The object of the instant invention is to improve the safety, usability, and cleaning process of the basic moka pot concept by completely reimagining it.

One exemplary embodiment of the disclosed subject matter is a coffee maker comprising a one-piece body having a top and an opposing bottom, and a brew pod removably disposed within the one-piece body. The brew pod preferably includes a grounds basket for holding coffee grounds to be brewed during a brewing process, one or more straws disposed under the grounds basket about the bottom of the one-piece body, and a snorkel removably disposed above the grounds basket about the top of the one-piece body. The snorkel permits brewed coffee to exit from the grounds basket and then flow into the one-piece body.

The one-piece body may include locking channels that mate with locking tabs on the brew pod. Such a locking means permits the brew pod to be locked securely in place during the brewing process.

The snorkel preferably includes a spout, an engagement member disposed under the spout, and a top hat disposed above the spout. The engagement member may have screw threads, with the grounds basket having complementary screw threads, to permit the engagement member to be detachably removable from the grounds basket.

The coffee maker may further comprise a gasket disposed between the engagement member and the grounds basket. The coffee maker may also include a means for filtering the brewed coffee after it exits the grounds basket. The filtering means may comprise a metal filter disposed within the engagement member. The filtering means may further comprise a paper filter disposed about the metal filter. With this arrangement, the gasket may include means for retaining the filter means disposed about the engagement member.

The coffee maker may also include means for lifting the one-piece body away from a heat source used during the brewing process. The lifting means preferably comprises a base disposed about the bottom of the one-piece body, a pneumatically actuated piston, a retaining screw in communication with the piston and the base, and a spring disposed about the piston. With this lifting arrangement, the coffee maker preferably includes two or more straws disposed under the grounds basket about the bottom of the one-piece body to allow room for the lifting means. Moreover, with this arrangement, the coffee maker may include a lid disposed about the top of the one-piece body, wherein the lifting means comprises a means for extending the lid away from the one-piece body during the brewing process.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

Figure 1:
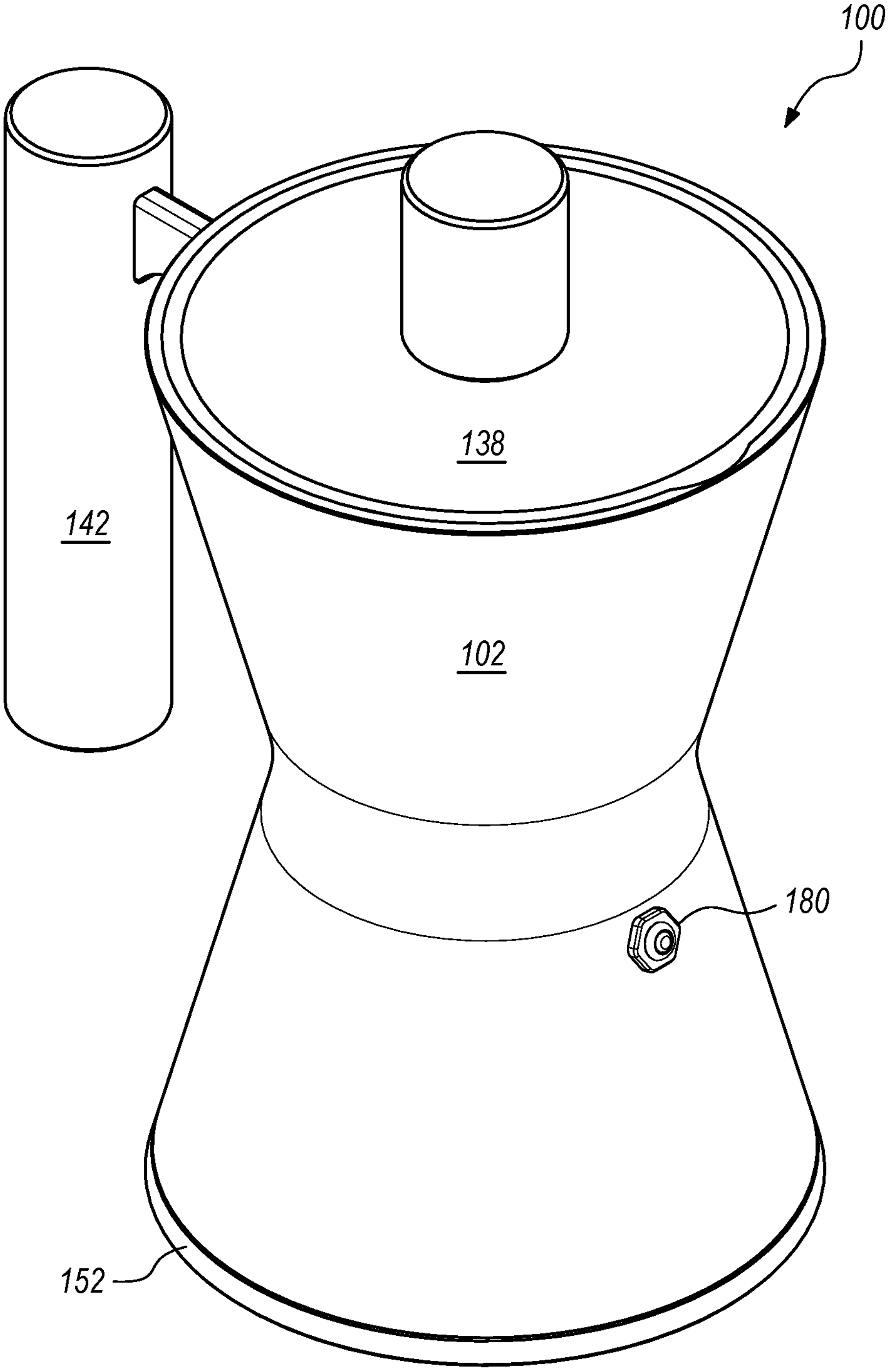
FIG. 1 is a top perspective view of an embodiment of the coffee maker disclosed herein.
Figure 2:
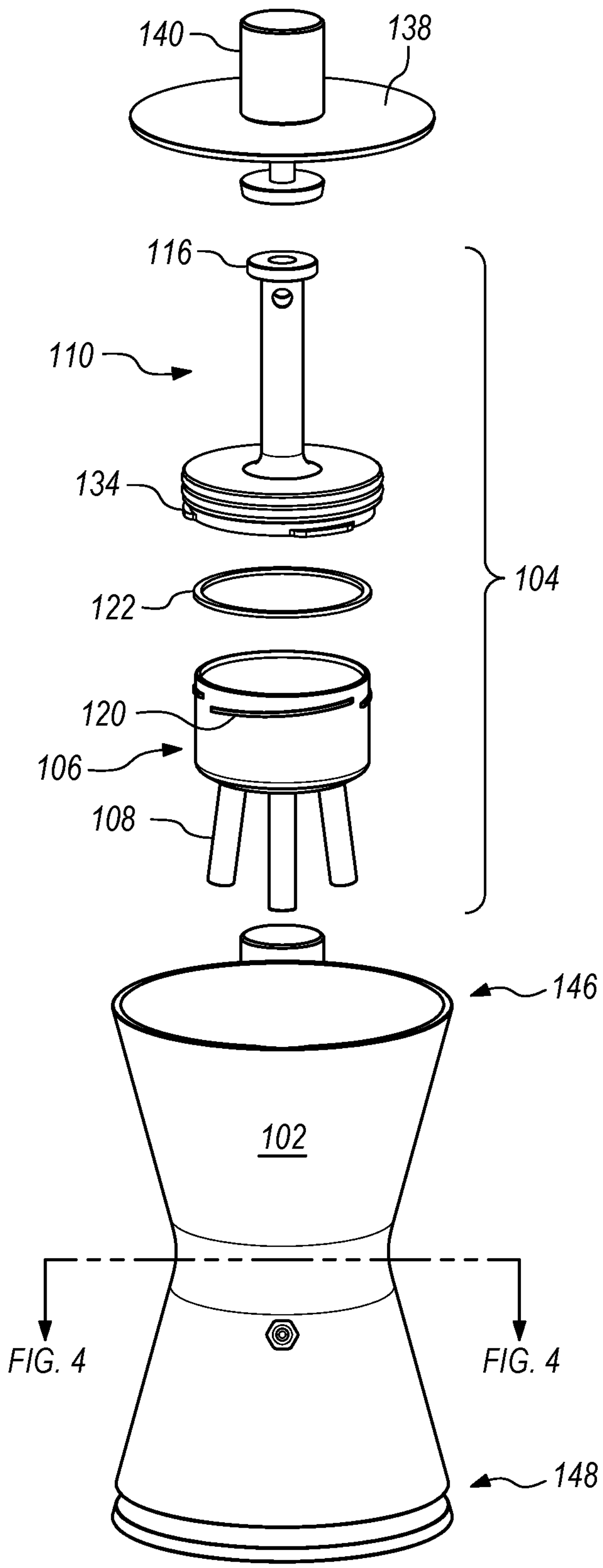
FIG. 2 is an exploded view of the coffee maker seen in FIG. 1.
Figure 3:
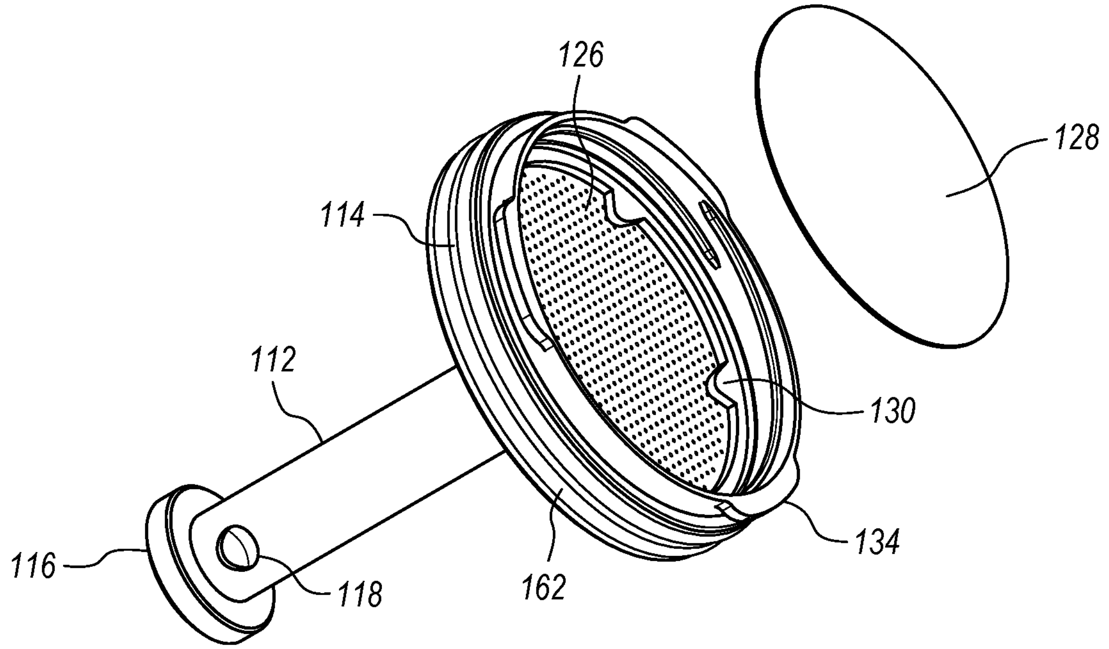
FIG. 3 is a detailed view of the snorkel of the coffee maker seen in FIG. 1.
Figure 4:
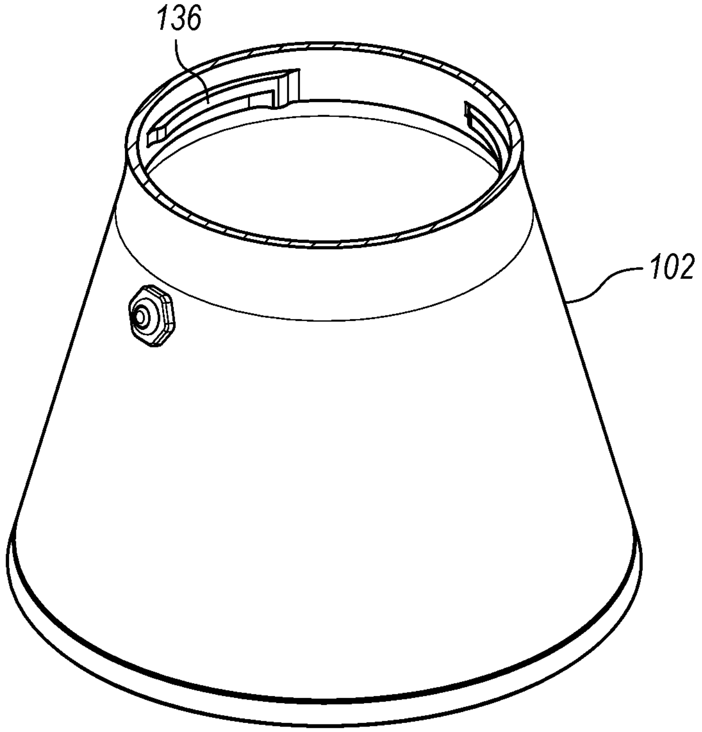
FIG. 4 is a detailed view of part of the locking means of the coffee maker seen in FIG. 1.

When Italian engineer Alfonso Bialetti first introduced the moka pot in 1933, it did not take long for his coffee maker to become a staple of Italian culture. Today, the moka pot is used throughout the world, most commonly in Europe and Latin America.

Almost a century later, the moka pot has remained largely unchanged in its design. The beauty and simplicity of its look is iconic and considered by many to be a work of art befitting its place in industrial art and design museums.

Just as the aesthetics of the moka pot have been largely evolution-proof, so has its functionality. In broad strokes, a moka pot brews coffee by passing hot water through grounds via steam pressure. Such brewing is accomplished via multiple components including a bottom piece that holds a funnel and basket, and an opposing top piece with an integrated dispensing column. The bottom and top members are screwed together to define a brewing chamber and an opposing collecting chamber.

In operation, for those trying to brew a worthy cup, there are several “tricks” to getting it right. The first step is choosing the right coffee and freshly grinding it to the desired fineness and consistency. Next, the user pre-heats the water to ensure the brew temperature is high enough for the bulk of the extraction. To do so, the user boils water and pours the scalding water into the brewing chamber. The user then fills the basket with the ground coffee. Next, the top piece must be put in place over the bottom piece. This step is quite dangerous as it involves screwing together a boiling-temperature bottom piece to a room temperature top piece. A heat-proof towel is always needed to prevent burning one’s hands.

The user then places the device directly on a stovetop, turns it on, and waits for the heated steam pressure to push the water through the funnel, then the coffee grounds, and then into and through the dispensing column. If too much heat is used, the device causes sputtering midway and until the end of the brew. The result is over-extraction and an acrid finish. To avoid such a catastrophe, the user needs to “babysit” the pot and watch the flow rate of the coffee coming out, manually removing the coffee maker from the flame when the flow rate speeds up too much and put the coffee maker back when the flow rate slows down too much or stops altogether.

When all factors are just right, the user has the perfect elixir to sit back and enjoy. However, at some point, the user will need to deal with a cumbersome cleaning process. Such process typically involves yet another heat-proof towel to unscrew a hot bottom piece from the hot top piece to be able to access the used coffee grounds. Thus, there are usability issues, not to mention safety issues, involved in both the brewing and cleaning processes of a conventional moka pot.

Accordingly, a coffee maker solving these and other problems is desired.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIGS. 1-6 illustrate an embodiment of a novel coffee maker 100 comprising a one-piece body 102 and a brew pod 104 to be fitted within the body 102. The one-piece body 102 has a top 146 and an opposing bottom 148 and may be any shape. However, the one-piece body 102 is preferably an hourglass shape to provide stability over a heat source, as well as to permit the device 100 to absorb heat more quickly and efficiently for reaching the brewing temperature and pressure. The one-piece body has a pressure relief valve 180, as seen in FIG. 1, to preclude over-pressurization.

The coffee maker 100 preferably includes a lid 138 having a holder 140. The lid 138 may be attached to the top 146 of the one-piece body 102 via a hinge or it may be fitted about the top 146, as seen in FIGS. 1-6. The coffee maker 100 also preferably includes a handle 142 extending therefrom.

The brew pod 104 includes one or more O-rings 162 that are capable of being seated within channels (not shown) in the interior of the one-piece body 102. When the brew pod 104 is seated within the channels, the brew pod 104 is preferably locked in its vertical position so the pressure from brewing does not push the brew pod 104 up and break the seal created by the O-rings 162. Such locking means may include locking tabs 134 disposed about the brew pod 104 and complementary locking channels 136 formed in the interior of the one-piece body 102. Other variations of the locking means includes screw threads to the inner diameter of the one-piece body 102 and corresponding male threads to the outer diameter of the brew pod 104, or the like. The top hat 116 may optionally include alignment means (not shown) so the user knows if the brew pod 104 is in a locked position or not.

The brew pod 104 comprises a grounds basket 106, one or more straws 108 disposed under the grounds basket 106, and a snorkel 110 disposed above the grounds basket 106. The snorkel 110 comprises a spout 112 with one or more output holes 118, an engagement member 114 disposed under the spout 112, and a top hat 116 disposed above the spout 112. The top hat 116 advantageously serves to prevent the brewed coffee from spurting upwards and creating a mess. The top hat 116 may optionally include alignment means (not shown) so the user knows if the brew pod 104 is in a locked position or not via the locking means.

The engagement member 114 includes channels (not shown) for seating the one or more O-rings 162. The engagement member 114 permits communication between the spout 112 and the one or more straws 108. The brew pod 104 includes a means for attaching the snorkel 110 to the grounds basket 106. Such attachment means may comprise female threads 120 disposed about the grounds basket 106 and corresponding male threads (not shown) disposed about the engagement member 114. Other variations of the attachment means includes tabs and detents or the like. The screw threads may be either standard screw threads or an easier-to-use "quick thread" that requires only a quarter turn or so to lock into place. To maintain a good seal between the snorkel 110 and the grounds basket 106, wherein the device 100 may have anywhere from 0.1 Bar to up to 2 Bar of brew pressure depending on the grind setting and preferred coffee taste, a gasket 122 is disposed between the snorkel 110 and the grounds basket 106.

The coffee maker 100 preferably includes a filter means to filter brewed coffee from coffee grounds disposed within the grounds basket 106. The filter means may include a metal filter 126 disposed about the engagement member 114. The metal filter 126 may be integrated into the engagement member 114 or removable from it to permit easy cleaning. The filter means may also include an optional paper filter 128 disposed about the metal filter 126. The addition of the paper filter 128 is advisable as paper filters perform better than metal filters as the former can hold back the undissolved coffee particles that create a more bitter and muddy taste. If the metal filter 126 is removable, it may be held into place by way of the gasket 122. In such case, it is preferable for the gasket 122 to have retaining means 130 for retaining the metal filter 126 inside the engagement member 114. These same retaining means 130 may also be used to retain the paper filter 128 against the metal filter 126.

The coffee maker 100 may include an optional lifting means for lifting the one-piece body 102 away from a heat source to avoid having to babysit the device 100 during the brewing process. Such lifting means preferably comprises a base 152 disposed about the bottom 148 of the one-piece body 102, a pneumatically actuated piston 156 having a piston rod extending therefrom, and a retaining screw 154 in communication with the piston 156. The pneumatically actuated piston 156 is disposed within a piston chamber 150 formed inside of the one-piece body 102 about its bottom 148. The piston chamber 150 has a top end and a bottom end. The top end of the piston chamber 150 is sealed via O-rings 160. The bottom end of the piston chamber 150 has an opening adapted to receive the piston 156. The pneumatically actuated piston 156 is slideably disposed within a piston sleeve disposed within the piston chamber 150. A spring 158 having a biasing force is disposed between the piston sleeve and the piston rod. The retaining screw 154 creates a pre-load setting against the spring 158. A seal ring is preferably disposed about the retaining screw 154. Other lifting means, such as those disclosed in U.S. patent application Ser. No. 17/903,348 filed on Sep. 6, 2022, which is incorporated by reference as if fully set forth herein, may also be employed.

Figure 5:
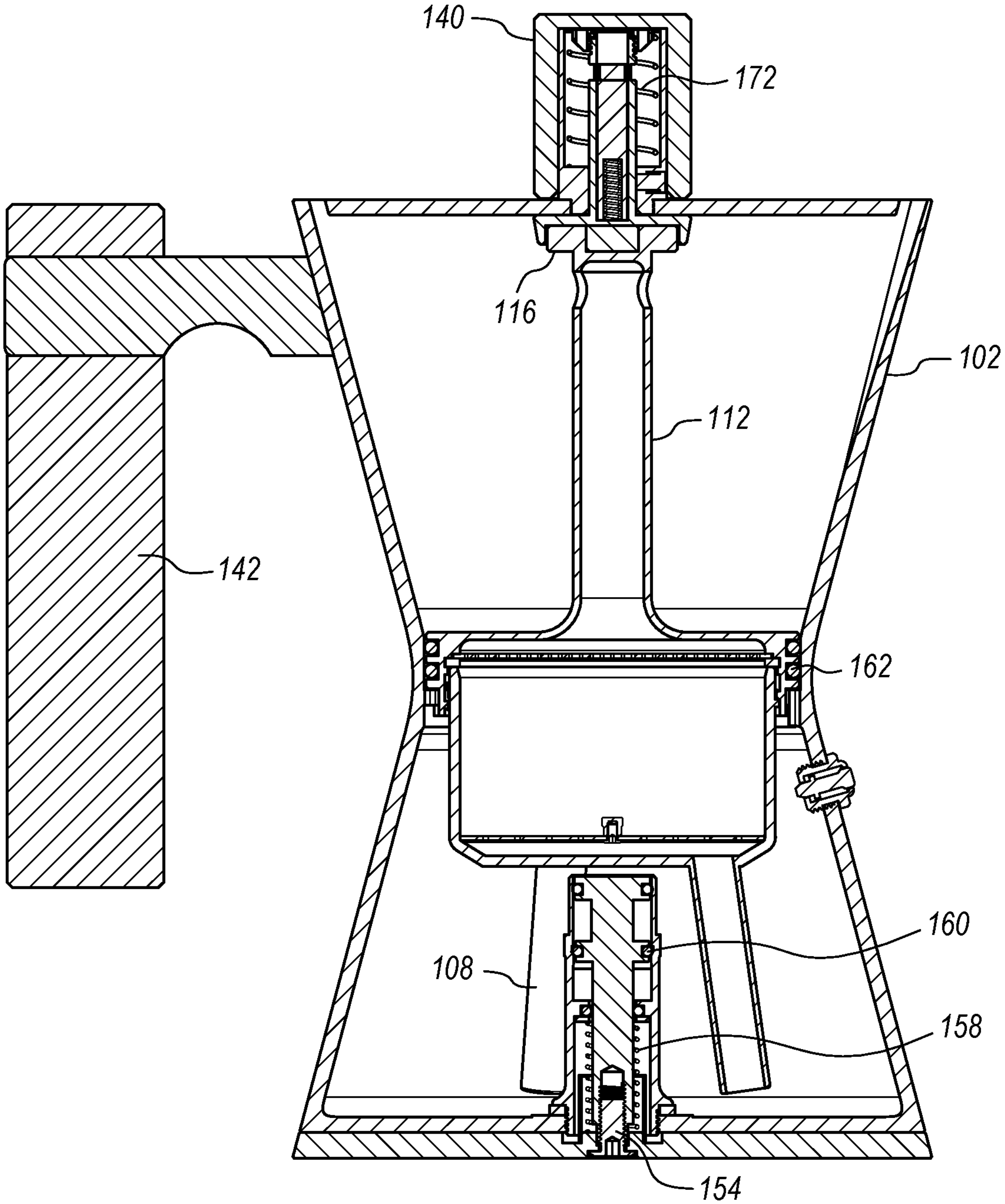
FIG. 5 is a cut-away view of the coffee maker seen in FIG. 1, wherein the device is shown in its “down” position.
Figure 6:
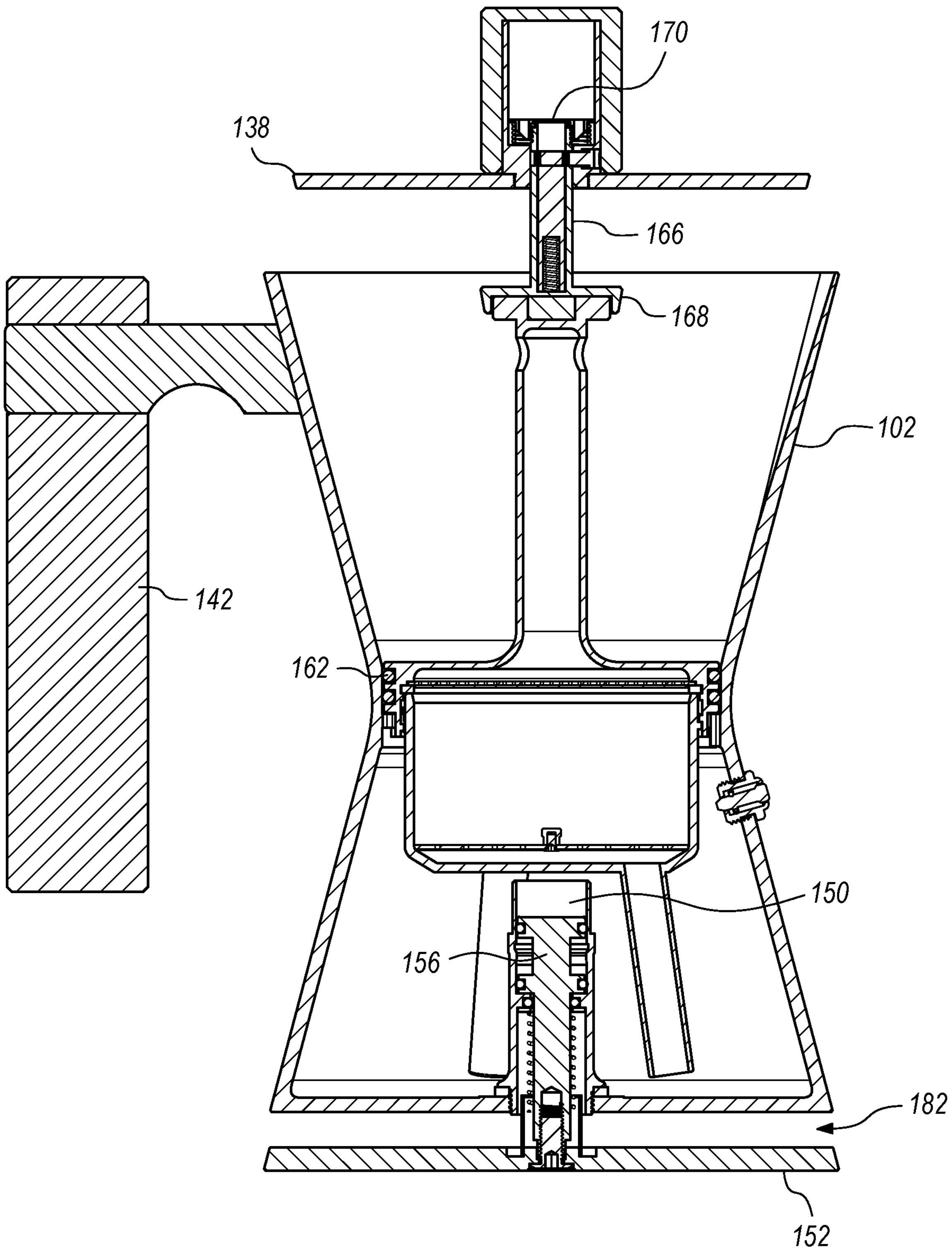
FIG. 6 is a cut-away view of the coffee maker seen in FIG. 1, wherein the device is shown in its “up” position.

Spring 158 may be tuned such that the lifting means is activated when the pressure in the interior chamber of the bottom 148 of the one-piece body 102 reaches 0.1 bar to 1.5 bar, an ideal range for brewing the perfect coffee. Exemplary numbers are the following: (1) in an "up" state without water or coffee grounds, as seen in FIG. 5, the invention 100 may weigh 792 g; O-rings 160 may create resistance equating to 50 g; and spring 158 may create resistance equating to −850 g, wherein the overall effect is that of −8 g; (2) in a "down" state, as seen in FIG. 6, with water and coffee grounds (not shown), the invention 100 may weigh 792 g; O-rings 158 may create resistance equating to 50 g; coffee grounds may weigh 20 g; water may weigh 250 g; and spring 158 may create resistance equating to −850 g, wherein the overall effect is that of 262 g; and (3) in a "up" state with water and coffee grounds, the invention 100 may weigh 792 g; O-rings 158 may create resistance equating to 50 g; coffee grounds may weigh 20 g; water may weigh 250 g; spring 158 may create resistance equating to −850 g; and a piston diameter of 1.7 cm may create resistance equating to −277 g, wherein the overall effect is that of 15 g.

Should the coffee maker 100 include the optional lifting means, then at least two straws 108 should extend downward from the grounds basket 106. The use of two or more straws 108 also advantageously permits the grounds basket 106 to stand upright on its own for ease of filling the grounds basket 106 with coffee grounds. Moreover, with the lifting means employed, the device also preferably includes an optional extension means whereby the lid 138 may be extended away from one-piece body 102 during the brew process, as illustrated in FIG. 6. Doing so permits the user to watch the coffee being brewed to verify the speed and consistency of the brew and adjust the heat source accordingly. Such an extension means preferably comprises an extension rod 166, a foot 168 disposed under the extension rod 166, a head 170 disposed above the extension rod 166, and a spring 172 disposed about the extension rod 166 between the foot 168 and the head 170. The extension rod 166 is slideably disposed within holder 140. The spring 172, when not engaged by the lifting means during the brew process, is biased to keep the lid 138 against the top 146 of the one-piece body 102, as illustrated in FIG. 5. The foot 168 is preferably adapted to receive the top hat 116 to better engage and maintain the position of the lid 138 when in the device 100 is in its "up" position, as seen in FIG. 6.

In operation, the user may begin by placing the desired amount of coffee grounds into the grounds basket 106. If a paper filter 128 is desired to be used, the user places paper filter 128 between the gasket 122 and the grounds basket 106. Should the gasket 122 include retaining means 130, they will help hold the paper filter 128 in place. The user then attaches the snorkel 110 to the grounds basket 106 by way of the attachment means such as by rotation of the threading 120. The user then pours water into the interior chamber of the one-piece body 102. The water may be pre-heated as desired. Next, the user places the brew pod 104 into the one-piece body 102. The user then engages the locking means to keep securely the brew pod 104 seated within the one-piece body 102 during the brew process and does so by rotating the brew pod 102 to have the locking tabs 134 mate within the locking channel 136, as seen in FIGS. 5 and 6.

Next, the coffee maker 100 is placed onto a stovetop, which is turned on to start heating up the water or continue to heat water up if pre-heated. At some point during the heating process, there is enough pressure inside the interior chamber of the one-piece body 102 to force the water through the one or more straws 108, through the coffee grounds contained within the grounds basket 106, through the paper filter 128, through the metal filter 126, through the spout 112, and eventually the output holes 118. Before or after the user decides to enjoy the coffee elixir, the user may decide to clean the coffee maker 100. The user does so by simply taking up the lid 138 by holder 140 and then disengages the locking means to detach the brew pod 104 from within the one-piece body 102. The user then merely detaches the snorkel 110 from the grounds basket 106 to be able to dump the used coffee grounds.

At no time during the brew process or the cleaning process does the user need to employ a heat-proof towel. Indeed, it should now be apparent that the novel coffee maker disclosed herein permits the user to brew delicious coffee safely and easily, as well as permits the user to clean up the coffee maker safely and easily.

Should the coffee maker 100 include the optional lifting means arrangement, then in operation, the user may begin by placing the desired amount of coffee grounds into the grounds basket 106. If a paper filter 128 is desired to be used, the user places paper filter 128 between the gasket 122 and the grounds basket 106. Should the gasket 122 include retaining means 130, they will help hold the paper filter 128 in place. The user then attaches the snorkel 110 to the grounds basket 106 by way of the attachment means such as by rotation of the threading 120. The user then pours water into the interior chamber of the one-piece body 102. The water may be pre-heated as desired. Next, the user places the brew pod 104 into the one-piece body 102. The user then engages the locking means to keep the brew pod 104 securely seated within the one-piece body 102 during the brew process and does so by simply rotating the brew pod 102 to have the locking tabs 134 mate within the locking channel 136, as seen in FIGS. 5 and 6.

Next, the coffee maker 100 is placed onto a stovetop, which is turned on to start heating up the water or continue to heat water up if pre-heated. During the initial heating period, there is not enough pressure against the piston 156 to overcome the biasing force of the spring 158 pushing the piston 156 away from the base 152, even with the pre-load created by the retaining screw 154. However, there is enough pressure inside the interior chamber of the one-piece body 102 to force the water through the straws 108, and then through coffee grounds, wherein coffee is output through the output holes 118. With increased time of the device 100 over the heat source, the pressure increases until a critical pressure has been reached. Such critical pressure is when the pressure inside the interior chamber is now sufficient enough to overcome the biasing force of the spring 158 to begin to push the piston 156 toward the base 152. Once the critical pressure has been reached, additional time and hence pressure inside the interior chamber continues to push the piston 156 toward the base 132 until the piston rod, via the adjustment screw 154, pushes against the base 152.

FIG. 6 captures the instance in time wherein the lifting means has done its job by lifting the bottom 148 of the one-piece body 102 away from the base 152 to create an air gap 182 between the one-piece body 102 and the base 152. Such an air gap 182 effectively raises the bottom 148 of the one-piece body 102 away from the heat of the stovetop to preclude any overheating and thus avoid a bitter and unappealing cup of coffee. Such an air gap 182 also overcomes the biasing force of the spring 172 in the extension means to raise the lid 138 above the top 148 of the one-piece body 102, as seen in FIG. 6.

The air gap 182 decreases the pressure inside the interior chamber of the one-piece body 102 to permit the biasing force of spring 158 to push the piston 156 back into the piston chamber 132, as well as permit the biasing force of spring 172 to push the lid 138 back down against the top 146 of the one-piece body 102. As a result, the bottom 148 of the one-piece body 102 falls back down to the base 152, as seen in FIG. 5. The user then turns off the stovetop and finishes by pouring a great cup of coffee. The coffee perhaps even tastes better to the user as the user revels in the facts that there was no need to babysit the entire process, nor use a heat-proof towel during either the brew or cleaning process.

While certain embodiments have been described, the embodiments have been presented by way of example only and are not intended to limit the scope of the inventions. Indeed, the novel coffee maker described herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. A coffee maker comprising:

a one-piece body having a top, an opposing bottom, and an interior chamber; and a brew pod removably disposed within the one-piece body, the brew pod comprising:

a grounds basket for holding coffee grounds to be brewed during a brewing process;

one or more straws disposed under the grounds basket about the bottom of the one-piece body, the one or more straws being in fluid communication with the grounds basket and configured to direct water from the interior chamber into the grounds basket during the brewing process; and a snorkel removably disposed above the grounds basket about the top of the one-piece body, wherein the snorkel permits brewed coffee to exit from the grounds basket and then flow into the one-piece body, wherein, during the brewing process, pressure inside the interior chamber of the one-piece body forces water through the one or more straws, through coffee grounds contained within the grounds basket, through a filter arrangement, and through the snorkel.

2. The coffee maker of claim 1, further comprising one or more locking tabs disposed about the brew pod and one or more locking channels formed in an interior of the one-piece body, wherein the one or more locking tabs are configured to mate with the one or more locking channels to lock the brew pod securely in place within the one-piece body during the brewing process.

3. The coffee maker of claim 1, wherein the snorkel includes a spout, an engagement member disposed under the spout, and a top hat disposed above the spout.

4. The coffee maker of claim 3, wherein the top hat includes alignment means configured to indicate whether the brew pod is in a locked position relative to the one-piece body.

5. The coffee maker of claim 3, wherein the engagement member has screw threads, and wherein the grounds basket has complementary screw threads to permit the engagement member to be detachably removable from the grounds basket.

6. The coffee maker of claim 5, further comprising a gasket disposed between the engagement member and the grounds basket.

7. The coffee maker of claim 6, further comprising a filter configured to filter the brewed coffee after it exits the grounds basket.

8. The coffee maker of claim 7, wherein the filter comprises a metal filter disposed within the engagement member.

9. The coffee maker of claim 8, wherein the filter further comprises a paper filter disposed about the metal filter.

10. The coffee maker of claim 6, further comprising a filter configured to filter the brewed coffee, wherein the filter is disposed about the engagement member, and wherein the gasket includes retaining portions configured to retain the filter about the engagement member.

11. The coffee maker of claim 1, further comprising a lifting assembly configured to lift the one-piece body away from a heat source used during the brewing process.

12. The coffee maker of claim 11, wherein the lifting assembly comprises a pneumatically actuated piston.

13. The coffee maker of claim 12, wherein the lifting assembly further comprises a base disposed about the bottom of the one-piece body, and a retaining screw in communication with the pneumatically actuated piston and the base.

14. The coffee maker of claim 13, wherein the lifting assembly further includes a spring disposed about the pneumatically actuated piston.

* * * * *